Sept. 13, 1966  A. U. BRYANT  3,272,470
FLUID FLOW CONTROL DEVICE
Filed Feb. 6, 1964  2 Sheets-Sheet 1
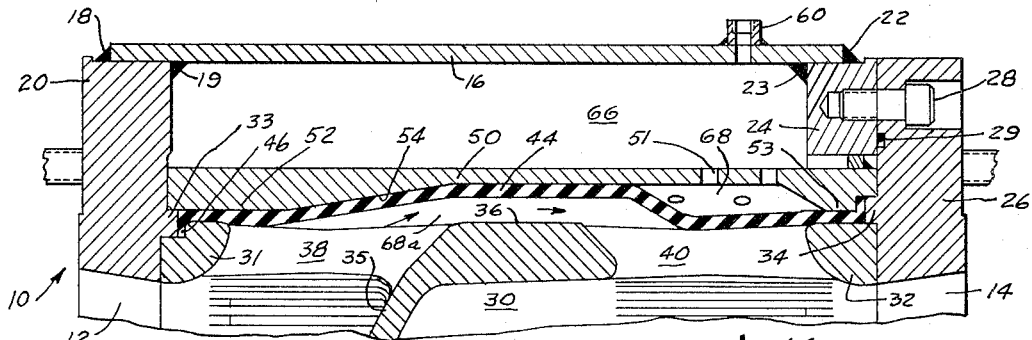
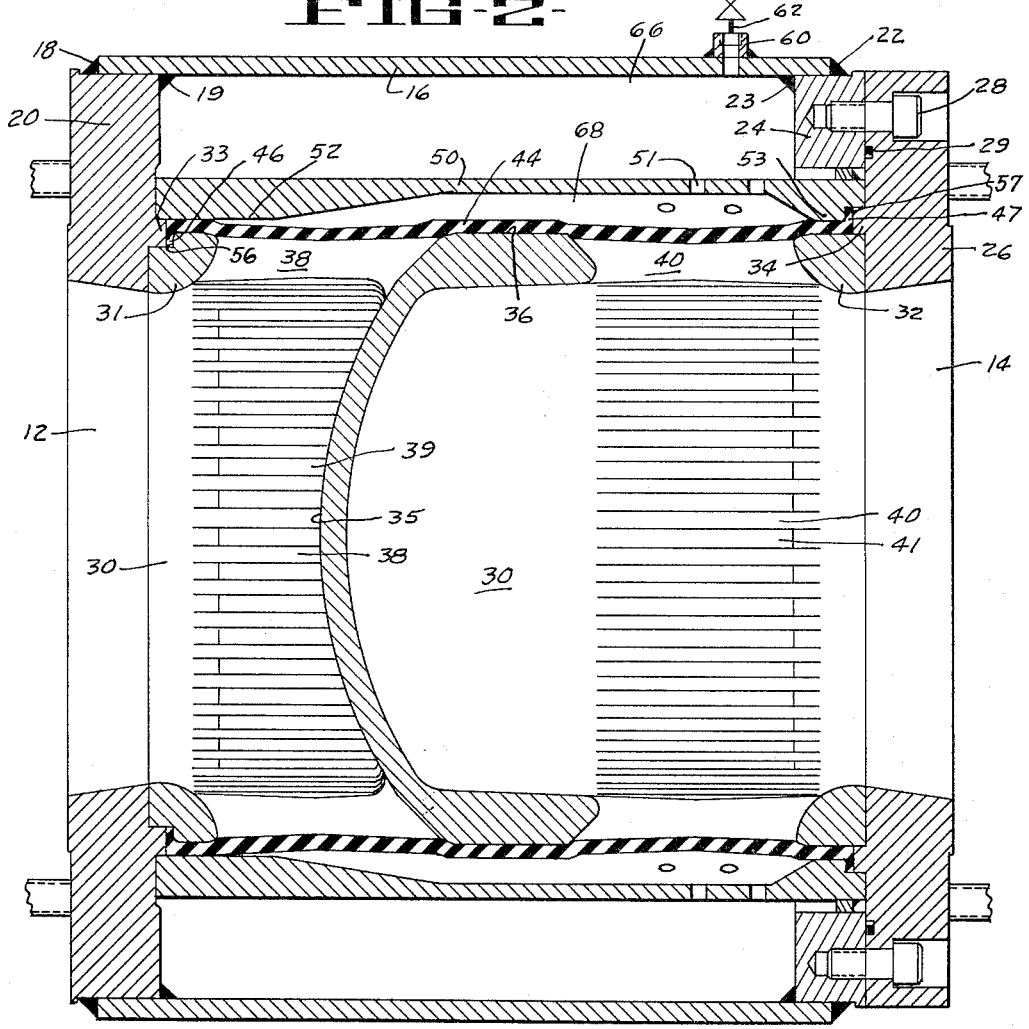
INVENTOR.
AUSTIN U. BRYANT
BY Edward B. Gregg
ATTORNEY

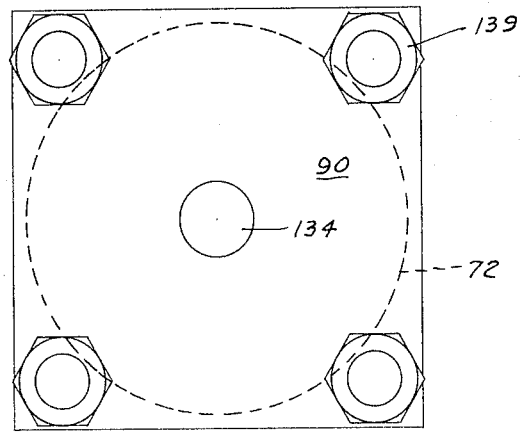
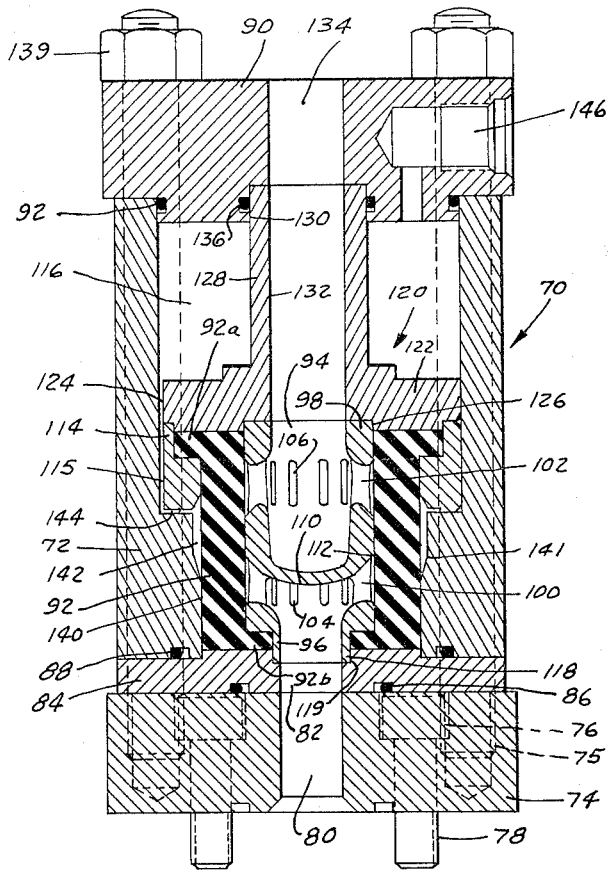

3,272,470
FLUID FLOW CONTROL DEVICE
Austin U. Bryant, Walnut Creek, Calif., assignor to Grove Valve and Regulator Company, Oakland, Calif., a corporation of California
Filed Feb. 6, 1964, Ser. No. 342,910
5 Claims. (Cl. 251—61)

This invention relates to a fluid flow control device and, more particularly, to a fluid flow control valve of the expansible sleeve type such as that disclosed in my earlier United States Patent No. 2,353,143, granted July 11, 1944, for Fluid Control Flow Device.

Briefly, the valve disclosed in that patent comprises a body having inlet and outlet flow passages between which is positioned a circular barrier with a space around it within the housing providing a flow path around the barrier. A cylindrical sleeve of resilient material fits snugly over the circular barrier and is sealed at its opposite ends within the housing. The internal diameter of the sleeve is normally slightly smaller than that of the barrier so that it is stretched over the circular barrier to provide a snug sealing fit under force of the tensioned resilient material, in absence of fluid pressure acting against it. The barrier prevents fluid flow directly through the valve and, normally the sleeve prevents flow around the barrier. However, at sufficient pressure, the fluid within the sleeve expands it outwardly and flows around the barrier to the outlet flow passage.

In operation, a control pressure is introduced into the housing around the resilient sleeve to oppose outward expansion and maintain the sleeve in sealed relationship as long as the control pressure is as great or greater than the upstream pressure. Then, in the event that the control pressure, augmented by the tension in the expansible sleeve, is overcome, the sleeve expands outwardly to permit fluid flow. As described more fully in the aforesaid patent, the flow clearance about the periphery of the barrier must be quite narrow relative to the barrier's diameter in order to avoid severe pulsations or chattering, or even distortion or rupturing of the resilient sleeve.

In most installations, valves of this type have worked quite satisfactorily. However, the rapidity with which such valves will act in response to upstream deviations from the control pressure is limited by the capacity of the small control pressure intake line to accommodate the backward flow and compression of the control fluid as the resilient sleeve expands to occupy the normal control fluid chamber. That is, since the volume within the housing around the expansible sleeve must to a large extent, be evacuated as the sleeve expands, the control gas must flow back or be compressed in the relatively small supply line. The restriction of the supply line may retard the action of the expansible sleeve valve.

It is, therefore, an object of this invention to provide a valve of the expansible sleeve type that is capable of operation at a rapid rate.

It is a further object of this invention to provide a valve of the expansible sleeve type having means for controlling the rate of valve operation.

It is a further object of this invention to provide a flexible sleeve valve that is reliable in operation and relatively easy to manufacture.

In carrying out this invention, I provide around the expansible sleeve in a valve of the type shown in my Patent No. 2,353,143, a rigid sleeve for limiting the outward expansion of the expansible sleeve. The rigid sleeve is secured within the housing with a substantial space in communication with the interior of the sleeve to provide a relatively sizeable control fluid chamber. In one form of the invention the rigid sleeve is spaced within the housing with a chamber around it, and a plurality of perforations in the sleeve provide free communication of control fluid within the housing and around the expansible sleeve. Thus, the outward expansion of the resilient sleeve is restricted by the perforated sleeve but, at the same time, there is a sizeable chamber around the perforated sleeve that is unoccupied by the resilient sleeve even at full expansion. The control fluid around the expansible sleeve can flow freely through the apertures in the rigid sleeve and compress in the surrounding chamber.

Other objects and advantages of this invention will become apparent from the description following when read in conjunction with the accompanying drawings wherein:

FIG. 1 is a view in vertical section showing a valve incorporating the features of this invention;

FIG. 2 is a partial section view showing operation of the valve;

FIG. 3 is a view in vertical section showing a modified form of valve embodying features of this invention; and FIG. 4 is an end view of the valve of FIG. 3.

Referring to the drawings with greater particularity, the valve body 10 includes inlet and outlet flow passages 12 and 14, respectively. While the body 10 may be cast or fabricated by any of a number of methods, the valve body illustrated comprises a surrounding body enclosure wall plate 16 which is welded at 18 and 19 to an upstream end plate 20, the welds being continuous to form a fluid tight joint. The enclosure plate 16 is also welded around its other end at 22 and 23 to ring 24 which supports the downstream end plate 26 as by means of cap-screws 28. A suitable seal such as an O-ring 29 prevents leakage between the ring 24 and end plate 26.

Secured within the body is a generally cylindrical grid or cage 30 having annular ends 31 and 32 that are sealed within annular bosses 33 and 34 carried on the end plates 20 and 26. Fluid flow axially through the cage is prevented by a smoothly curved barrier 35 which terminates at its periphery in a generally cylindrical sealing surface 36. On the upstream side of the barrier 35, the cylindrical cage 30 is formed by a series of spaced ribs 38 separated by slots 39 through which fluid may flow freely around the barrier. On the downstream side of the barrier 35, a second set of ribs 40 separate a series of slots 41 through which this fluid may flow back into the cage 30 and then out through the outlet passage 14. It will be noted in FIG. 1 that the cylindrical sealing surface 36 and the annular ends 31 and 32 are of a slightly larger diameter than the ribbed portions 38 and 40 to facilitate machining.

Carried on the grid is an expansible sleeve or tube 44 formed of relatively resilient material such as rubber or equivalent synthetic material. The tube is preferably cylindrical in shape conforming to the grid 30 and has integral inturned and outturned flanges 46 and 47 at opposite ends. The expansible sleeve 49 is preferably of an internal diameter normally slightly less than that of the sealing surface 36 of the grid 30 so that it is stretched over the grid to engage the cylindrical sealing surface under tension. The expansible sleeve is surrounded by a rigid perforated sleeve 50 provided with one or more apertures 51 over the cylindrical surface thereof and is seated at opposite ends on the outer surfaces of the annular bosses 33 and 34 on the end plates 20 and 26, respectively. The rigid sleeve 50 forms an expansion limiting member for the resilient sleeve 44 and is, at opposite ends 52 and 53 of generally the same diameter as the external diameter of the expansible sleeve 44. From the minimum internal diameter at opposite ends 52 and 53 the rigid sleeve gradually flares outward at 54 in internal diameter to form a smooth surface against which the expansible sleeve may expand, as hereinafter described.

As the valve 10 is assembled as shown, the expansible sleeve 44 is stretched over the grid 30 and both are inserted into the rigid sleeve 50. Then, the entire assembly is inserted through the body end ring 24 until the annular end of the cylindrical grid 30 fits within the annular boss 33 on the end plate 20 with the rigid sleeve 50 embracing the outside of the same boss 33. Then, the end plate 26 is secured in place so that the boss 34 fits between the expansible sleeve 44 and the rigid sleeve 50. Shoulders 56 and 57 on the grid and rigid sleeve, respectively, clamp the internal and external flanges 46 and 47 of the resilient sleeve 44 against the annular bosses on the valve body end plates 20 and 26, to effect seals at opposite ends between the expansion tube and the housing.

Opening into the housing 10 at a suitable fitting 60 is a conduit 62 with valve 64 (both shown schematically) through which source of supply (not shown) may be introduced into the housing 10. With the structural arrangement shown, the control pressure fluid is sealed within the housing 10 by closing the valve 64 but it is apparent that the conduit could be in open and continuous communication with a source of constant pressure. The control fluid may be at any desired pressure and enters the housing 10 to fill the chamber 66 around the rigid sleeve 50 and, by flowing through the holes 51, it also fills the chamber 68 between the expansible sleeve 44 and the rigid sleeve 50.

In operation of the valve 10, a control pressure is maintained within the outer and inner chambers 66 and 68 at the desired level and, as long as the control pressure, augmented by the tension in the stretched sleeve 44, exceeds the pressure within the grid 30 on the upstream side of the barrier 35, the expansible tube will continue to seal around the cylindrical surface 36 and prevent flow of fluid to the downstream side. However, if the upstream pressure builds up to a level exceeding the control pressure by the small amount necessary to overcome the tension of the stretched resilient sleeve 44 against the cylindrical sealing surface 36, the expansible sleeve will commence to expand initially at the upstream end thereof until it contacts the tapered wall 54 and then the expansion progresses toward the downstream side until the rubber tube is lifted clear of the barrier 35 and, particularly, the cylindrical sealing portion thereof 36, as shown in FIG. 2. The liquid will then be free to flow from the inlet passage 12 of the valve 10, through the slots 39 to the annular flow passage 68a (FIG. 2) between the barrier 35 and the expansible tube 44. After passing around the barrier, the fluid flows back into the grid 30 through the slots 41 and then is released through the outlet passage 14. This flow continues until the upstream pressure subsides to a level wherein the control pressure plus the tension in the expansible tube is sufficient to overcome the upstream pressure and again cause the resilient tube 44 snugly to engage the cylindrical sealing surface 36 of the grid 30. Thus, in the operation described, the valve 10 is charged with a constant control pressure adapted to release pressure build-ups, and therefore, functions as a relief valve. Obviously, the valve could also function with a variable controlled pressure fluid which may be reduced or increased in pressure to open or close the valve, the variation in control pressure being effected manually or by a suitable parameter-sensing pilot system.

The internal diameter of the expansion-limiting sleeve must be kept to close limits so that the annular space 68a between the expansible sleeve and the cylindrical sealing surface in full open position is relatively small compared to the diameter of the barrier. This is a particularly essential feature because I have found that unless the ratio of this clearance to the diameter of the barrier is no greater than 1 to 10, and preferably 1 to 16, severe pulsations or chattering may result.

However, there are no limitations on the size of the outer chamber 66 other than those dictated by the environment in which the valve is used and the chamber 66 is preferably of much greater volume than that of the inner chamber 68. Thus, as the sleeve 44 expands to the position shown in FIG. 2, forcing the control fluid out of the inner chamber 66, the total volume of both chambers, in free communication through parts 51, is not reduced appreciably and relatively little compression of the control gas is required.

Of course, an increase in the number or size of the holes 51 which are provided in the rigid sleeve 50, will increase the capacity to evacuate the inner chamber 68, producing more rapid valve operation. Hence, it is contemplated that the valve 10 may be supplied with any of various expansion limiting sleeves 50, each provided with different flow capacity through holes 51 so that the speed of valve operation can be selected.

While the rigid sleeve illustrated 50 has a large number of openings 51 it could have but a single opening within the scope of this invention. It is merely contemplated that the sleeve have one or more openings to achieve the desired flow capacity between the interior and exterior of the rigid sleeve. From the standpoint of manufacturing costs it is, of course, desirable to drill as few holes 51 as possible. On the other hand, limitations as to hole diameter occasioned by the tendency of the resilient sleeve to bulge out precludes the achievement of flow capacity through hole size alone.

Referring now to embodiment of FIGS. 3 and 4, the valve 70 there shown includes a main body portion 72 of any suitable cross-section such as the cylindrical form shown. On the inlet side of the valve 70 is a mounting plate 74 having tapped holes 75 with counterbores 76 to accommodate cap-screws 78 which protrude through the mounting plate 74 for attachment of the valve to a panel (not shown) or other suitable member associated with a fluid system to be controlled. Extending through the mounting plate 74 is a conduit passage 80 that is aligned axially with an inlet passage 82 of the valve proper 70. An upstream valve end plate 84 is sealed by means of O-rings 86 and 88 to the mounting plate 74 and to the main valve body portion 72.

Prior to attachment of the downstream end plate 90, a resilient expansible sleeve 92 is stretched over a grid or cage member 94 having annular end portions 96 and 98, and upstream and downstream ribs 100 and 102 providing transfer passage slots 104 and 106 around the cylindrical grid 94. Extending across the grid 94 is a circular barrier 110 having a cylindrical outer sealing surface 112. Embracing the downstream end of the expansible sleeve 92 is a ring 114 having a series of spaced webs or lugs 115 extending both radially and axially therefrom to provide space between the lugs for fluid flow. After the ring 114 is placed over the expansible sleeve 92 and against the outturned downstream flange 92a, the grid 94 with expansible sleeve is inserted into the large downstream cavity 116 in the valve body 72. An annular projection 118 on the upstream end of the grid seats within a counterbore 119 in the upstream valve end plate 84, with the inturned flange 92b of the resilient sleeve 92 compressed between the annular end 96 of grid 94 and the valve body end plate 84, to form a seal. Finally, a centering member 120 having an enlarged circular plate 122 with spaced radial projections 124 providing flow spaces therebetween is inserted into the large body cavity 116 until a large bore 126 in the upstream face of the circular plate 122 received the downstream annular end 98 of the grid to hold it centered within the body cavity 116. A portion is received within a counterbore 130 in the downstream end plate 90 to rigidify the structure and to provide a conduit 132 to the outlet passage 134. Preferably, a suitable seal such as an O-ring 136 is provided to seal between the cylindrical extension 128 and the downstream end plate 90 and isolate the chamber 116. Assembly is completed by tightening bolts 139 extending from the retcangular downstream end plate along the cylindrical body portion 72 and upstream end plate to the rectangular mounting plate 74.

It is to be noted that the internal diameter of the main body portion 72 reduces at the upstream end 140 to minimum diameter snugly to receive the expansible sleeve and then enlarges slightly at 141, 142 to provide the rigid expansion-limiting surface which restricts the radial expansion of the sleeve to a relatively small distance compared with its diameter. The larger main body cavity 116 receives the ring 114 snugly embraces the expansible sleeve and the lugs 115 engage the radial shoulder 144 to provide spaces between the lugs for fluid flow radially and then axially from within the expansion-limiting cavity 142 to the chamber 116.

In operation, the pressure fluid is introduced into the valve body cavity 116 through a suitable fitting 146 and, by flowing radially through the spaces provided between the radial lugs 115 and down radially between the ring 114 and the shoulder 144, into the chamber immediately surrounding the expansible sleeve 92. Then, as in the embodiment of FIGS. 1 and 2, when the upstream pressure exceeds the control pressure by an amount sufficient to overcome the tension in the sleeve, the sleeve is moved outwardly to permit the fluid to flow around the circular barrier 110, back into the grid through the slots 106 and then through the bore 123 in the cylindrical extension 128, finally flowing out through the outlet passage 134 into the atmosphere or to any other zone to which excessive pressure is relieved. As the flexible sleeve expands, any gas in the chamber is forced back through the flow passageways between lugs 115 into the enlarged chamber 116 where it is readily compressed to expand again when the upstream pressure is relieved enough to permit retraction of the expansible sleeve.

While this invention has been described in conjunction with preferred embodiments thereof, it is apparent that those skilled in the art may make modifications and changes therein without departing from the spirit and scope of this invention which is defined by the claims appended hereto.

Having described my invention, I claim:

1. A valve construction comprising:
a housing having inlet and outlet flow passages,
a circular barrier having a peripheral cylindrical sealing surface secured within said housing intermediate said flow passages,
an expansible sleeve in sealed communication at opposite ends thereof to said flow passages and snugly embracing the cylindrical sealing surface of said barrier,
a rigid sleeve surrounding said expansible sleeve in closely spaced relationship thereto so that the inner surface of said rigid sleeve limits radial expansion of said expansible sleeve,
said rigid sleeve having at least one aperture therethrough, having a total flow capacity restricted sufficiently so as to control the rate of movement of said expansible sleeve preventing chatter and being mounted in said housing with portions thereof in spaced relationship to said housing to form a fluid chamber of substantial volume within said housing around said rigid sleeve, and
means for introducing a compressible pressure fluid into one of said rigid sleeve and said chamber.

2. The valve construction defined by claim 1 wherein:
the space between said expansible sleeve and the inner surface of said rigid sleeve is no more than one-tenth of the diameter of said barrier.

3. A valve construction comprising:
a housing having inlet and outlet flow passages,
a generally cylindrical cage member open at opposite ends secured within said housing,
a circular barrier extending across said cage member intermediate the ends thereof and having a cylindrical outer sealing surface,
flow openings around said cage member on both sides of said barrier,
an expansible sleeve sealed at its ends between said housing and said cage member around said opposite ends and snugly embracing the cylindrical sealing surface of said barrier,
a generally cylindrical rigid sleeve surrounding said sleeve in closely spaced relationship thereto so that the inner surface thereof limits radial expansion of said expansible sleeve,
said rigid sleeve having at least one aperture therethrough, having a total flow capacity restricted sufficiently so as to control the rate of movement of said expansible sleeve preventing chatter, and being concentrically mounted in said housing so as to form a fluid chamber of substantial volume within said housing around said rigid sleeve, and
means for introducing a compressible pressure fluid into said chamber.

4. The valve construction defined by claim 3 wherein:
the space between said expansible sleeve and the inner surface of said rigid sleeve is no more than one-tenth the cross-sectional dimension of said barrier.

5. A valve construction comprising:
a housing having inlet and outlet flow passages,
a generally cylindrical open ended cage member secured within said housing,
a circular barrier extending across said cage member intermediate the ends thereof and having an outer cylindrical sealing surface,
upstream and downstream flow openings around said cage member on opposite sides of said barrier,
an expansible sleeve on said cage member and sealed around opposite ends between said housing and said cage member and snugly embracing the cylindrical sealing surface of said barrier,
means in said housing forming a surface embracing said sleeve in closely spaced relationship thereto to limit radial expansion thereof,
means forming a fluid chamber of substantial volume in said housing,
means for introducing a compressible pressure fluid into said fluid chamber, and
means providing flow communication between said chamber and the space intermediate said expansible sleeve and said surface, said means having a total flow capacity restricted sufficiently so as to control the rate of movement of said expansible sleeve preventing chatter.

References Cited by the Examiner

UNITED STATES PATENTS

| | | | |
|---|---|---|---|
| 1,884,810 | 10/1932 | Muller | 137—510 |
| 2,317,376 | 4/1943 | Grove et al. | 251—5 |
| 2,353,143 | 7/1944 | Bryant | 251—61 X |
| 2,448,118 | 8/1948 | Pellettere | 138—30 |

FOREIGN PATENTS 1,281,289  12/1961  France.

M. CARY NELSON, *Primary Examiner.*

E. FEIN, *Assistant Examiner.*